M. M. McINTYRE.
VEHICLE SPRING.
APPLICATION FILED AUG. 8, 1914.
1,234,681.
Patented July 24, 1917.
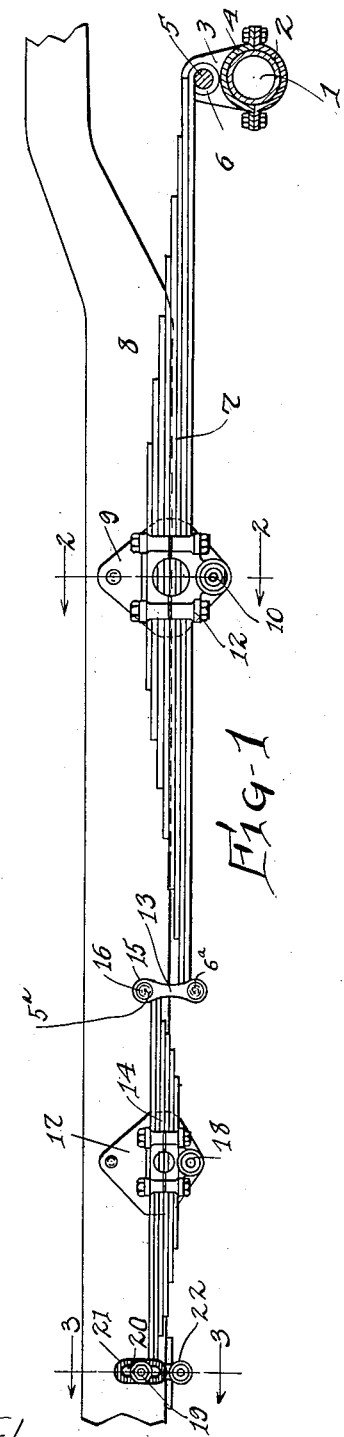
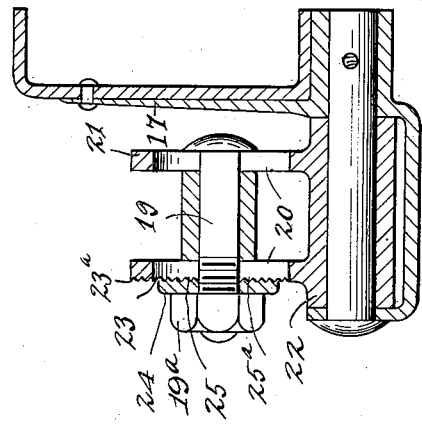
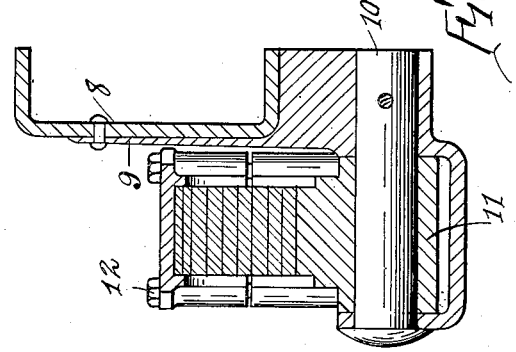
Witnesses
Inventor
Michael M. McIntyre,
BY Hull & Smith
Atty's.

UNITED STATES PATENT OFFICE.

MICHAEL M. McINTYRE, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

VEHICLE-SPRING.

1,234,681.

Specification of Letters Patent.

Patented July 24, 1917.

Application filed August 8, 1914. Serial No. 855,848.

*To all whom it may concern:*

Be it known that I, MICHAEL M. McINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.
This invention relates to vehicle springs and more particularly to springs of the type known as "cantaliver" springs which, as a rule, are connected at one end to the axle of a vehicle and pivotally connected intermediate to their ends to the frame, while the end opposite the axle is also connected to the frame. It is the general purpose of this invention to improve the riding qualities of springs of this kind; also to provide a construction whereby the spring or springs on either side of the vehicle may be adjusted in a particularly convenient manner to compensate for irregularities in the heights of the opposite sides of vehicles as well as to compensate for any wide variations in weight applied to the two sides of a vehicle. More limited objects of the invention will appear hereinafter and will be realized in and through the combinations of elements embodied in the claims forming part hereof.

In the drawings, Figure 1 represents a view in side elevation, with certain parts shown in section, of a spring assembly constructed in accordance with my invention, the spring being shown as applied to the axle and the portion of a side frame of a vehicle; Fig. 2 represents a detail of the adjustable connection between one end of the auxiliary spring and the vehicle frame corresponding to the line 2—2 of Fig. 1; and Fig. 3 an enlarged sectional detail corresponding to the line 3—3 of Fig. 1.

Describing by reference characters the various parts illustrated herein, 1 denotes the rear axle of an automobile and 2 the housing therefor. 3 denotes one of a pair of side members of a spring suspension frame which may be mounted on the housing 2 by means of clips 4. 5 denotes a pin or bolt connecting the upper ends of the side members 3 and extending through the eye 6 of the main plate of the spring thereby supporting one end of such spring. The spring (indicated generally at 7) is of the cantaliver type and comprises a suitable number of superposed plates. The intermediate portion of the spring is pivotally supported from the side frame 8 by means of a bracket 9 having a pivot bolt 10 which is adapted to extend through a suitable bushing or sleeve 11 carried by the lower half of a center clamp, the halves being connected by means of bolts 12. For convenience of description, it will be assumed that the spring 7 is the rear spring of an automobile and that the axle 1 is the rear axle, it being understood, however, that the same construction may, if desired, be employed as a front spring, with a corresponding reversal of arrangement. The front end of the main plate of the spring 7 is provided with an eye 6ª by means of which the front end of the spring is connected to a pair of shackle links 13 which shackle links are carried by the rear end of a short spring 14 of the cantaliver type and which is pivoted intermediate of its ends to the side frame 8. The cantaliver spring 14 is inverted, as compared with the main spring 7; that is to say, the main plate of the spring 14 is above the auxiliary plates. This main plate is provided with an eye 15 which receives a bolt by which the shackle links 13 are suspended, the lower ends of these links being connected to the eye 6ª of the main plate of the spring 7 in the ordinary manner, a bolt 5ª being indicated for this purpose. It will be observed that the spring 14 is pivotally supported from the frame 8, as by a bracket 17 and a center clamp pivot bolt 18, the pivot connection shown being identical in construction with the means whereby the main spring is pivotally supported from the side frame. The front end of the spring 14 is provided with an eye which is adapted to receive a bolt 19 and which bolt extends through elongated slots 20 in a pair of upwardly projecting shackle links 21, pivoted to the frame, as indicated at 22. It will be observed that one of these links (preferably the outer one) will be provided with a series of transverse ribs 23 with corresponding depressions 23ª therebetween. For the purpose of retaining the front end of the main spring at any desired elevation, a washer 24 may be employed having ribs 25 and depressions 25ª arranged complementarily to the ribs and depressions 23, 23ª on the face of the outer shackle link. This washer is adapted to be held in close engagement with the corrugated or ribbed surface of the outer link by adjusting the nut 19ª of the bolt 19 which will obviously press the corrugations of the washer into the depressions of the link, and vice versa.

With the parts constructed and arranged as described, the operation will be more or less self-evident. Should the wheel connected to the rear end of the spring 7 strike an obstruction, the spring 7 will be rocked upon the axis 10, but the spring 14 will soften the blow imparted to the frame by the front end of the spring, the spring 14 acting as a shock absorber which gradually absorbs and breaks the blow. The adjustability of the spring 14 is an important feature of my invention in that, through it, it is possible to compensate for any inequalities in the heights of the opposed side frames of the vehicle. By rocking either of the springs 14 in such manner as to elevate its rear end, the front end of the corresponding spring 7 will be correspondingly elevated, thereby elevating its pivotal spring seat and elevating the rear end of the frame.

A depression of the rear end of either the springs 14 will be accompanied by a corresponding depression of the rear end of the corresponding frame. It will be observed that the rear end of the spring 14 (the end which is connected to the main spring) is considerably shorter than the opposite end. This arrangement is prepared because of the fact that the end of the main spring with which it coöperates is the short end of that spring and a comparatively small adjustment of the rear end of the spring 14 will make a considerable variation in the adjustment of the spring seat 10. It will be evident that the spring 14 is, in effect a resilient lever.

While I have necessarily described my invention at considerable length and in considerable detail, I do not propose thereby to be limited to any specific details except as the same may be positively included in the claims hereto annexed or their inclusion may be rendered necessary by the state of the prior art.

Having thus described my invention what I claim is:

1. The combination, with a vehicle frame and axle, of a spring having one end connected to the axle and its intermediate portion pivotally connected to the frame, a spring supported by the frame and supporting the opposite end of the first mentioned spring, and means for adjusting the second spring thereby to vary the position of the adjacent end of the first mentioned spring with reference to its pivot and to correspondingly vary the relation between the axle and the frame.

2. The combination, with a vehicle frame and axle, of a spring connected at one end to the axle and pivotally connected intermediate of its ends to the frame, a second spring pivotally connected to the frame, means connecting the other end of the first spring to the adjacent end of the second spring, and means whereby the second spring may be adjusted about its pivot.

3. The combination, with a vehicle frame and axle, of a spring connected at one end to the axle, and pivotally connected intermediate of its ends to the frame, a second spring pivotally connected to the frame and extending in the same direction as the first spring, means connecting the adjacent ends of said springs, and means whereby the last mentioned spring may be adjusted about its pivot.

4. The combination, with a vehicle frame and axle, of a spring connected at one end to the axle and having an intermediate portion pivotally connected to the frame, a spring pivoted to the frame and having one end projecting toward the other end of the first spring, links connecting such spring ends, and means whereby the second spring may be adjusted about its pivot and secured in adjusted position, thereby to vary the elevation of the intermediate portion of the first mentioned spring with reference to the axle.

5. The combination, with a vehicle frame and axle, of a spring connected at one end to the axle and having an intermediate portion pivotally connected to the frame, a lever pivoted to the frame and having one end projecting toward the other end of the spring, links connecting such adjacent ends, and means whereby the lever may be adjusted about its pivot and secured in adjusted position, thereby to vary the elevation of the intermediate portion of the spring with reference to the axle.

6. The combination, with a vehicle frame and axle, of a spring connected at one end to the axle and pivotally connected intermediate of its ends to the frame, a spring pivoted intermediate of its ends to the frame on the side of the first mentioned pivot which is opposite the axle, links connecting the end of said spring with the adjacent end of the first mentioned spring, means pivotally supporting the opposite end of the second spring, means associated with the pivotal support whereby the distance of such end of the second spring from its pivot may be varied, and means for clamping or securing such spring end in any adjusted position.

7. The combination, with a vehicle frame and axle, of a spring connected at one end to the axle and pivotally connected intermediate of its ends to the frame, a spring pivoted intermediate of its ends to the frame on the side of the first mentioned pivot which is opposite the axle, links connecting the adjacent ends of said springs, means whereby the second spring may be adjusted about its pivot, and means whereby said spring may be secured in adjusted position.

8. The combination, with a vehicle frame and axle, of a main spring connected at one end to the axle and pivotally connected intermediate of its ends to the frame, an auxiliary spring pivoted intermediate of its ends to the frame, a pivotal connection between one end of the last mentioned spring and the end of the first mentioned spring which is opposite the axle, a pair of links pivotally connecting the opposite end of the second spring to the frame, said links having elongated slots therein, a bolt extending through said slots and connected to the spring end, and means whereby the bolt and the spring end may be clamped at any desired position with reference to said slots.

9. The combination, with a vehicle frame and axle, of a spring connected at one end to the axle and having an intermediate portion pivotally connected to the frame, a lever pivoted to the frame, means connecting an end of the spring to an end of said lever, and means whereby the lever may be adjusted about its pivot and secured in adjusted position, thereby to vary the elevation of the intermediate portion of the spring with reference to the axle.

10. The combination, with a vehicle frame and axle, of a spring connected at one end to the axle and pivotally connected intermediate of its ends to the frame, an elongated spring supported by the frame, means connecting the other end of the first spring to an end of the second spring, and means whereby the second spring may be adjusted thereby to vary the elevation of the intermediate portion of the first mentioned spring with reference to the axle.

In testimony whereof, I hereunto affix my signature in the presence of two witnesses.

MICHAEL M. McINTYRE.

Witnesses:
HARRY E. FIGGIE,
HAROLD E. SMITH.